Sept. 20, 1966  G. KINDER  3,273,478
PHOTOGRAPHIC CAMERA WITH BUILT-IN ELECTRONIC FLASH DEVICE
Filed Dec. 17, 1964  2 Sheets-Sheet 1

United States Patent Office 3,273,478
Patented Sept. 20, 1966

3,273,478
PHOTOGRAPHIC CAMERA WITH BUILT-IN
ELECTRONIC FLASH DEVICE
Gotthard Kinder, Braunschweig, Germany, assignor to
Voigtlander, A.G., Braunschweig, Germany, a corporation of Germany
Filed Dec. 17, 1964, Ser. No. 419,008
Claims priority, application Germany, Dec. 21, 1963,
V 25,073
5 Claims. (Cl. 95—11)

The present invention relates to cameras.

More particularly, the present invention relates to cameras which have built-in electronic flash assemblies.

It is already known to provide cameras of this type with a structure which will indicate to the operator when the electronic flash assembly is ready for operation.

Cameras of this type, in order to be able to properly make exposures with flash illumination, are conventionally provided with a structure which couples the distance-setting and diaphragm-setting structure of the objective together with the film-speed setting structure, in accordance with the particular flash guide number, so that it is in a known way possible to properly set the camera to make a proper exposure in accordance with the film speed, the distance between the object and the camera, and the size of the aperture which is set by the diaphragm.

One of the problems encountered with cameras of this latter type is that under certain photographing conditions the intensity of the light provided by the flash assembly will not necessarily provide a proper exposure either because the light intensity is too great or because the light intensity is too small for the particular conditions under which the exposure is to be made.

It is accordingly a primary object of the present invention to provide for a camera of the above type a structure which will indicate to the operator not only when the electronic flash assembly is ready for operation but also when a proper exposure cannot be made with the electronic flash assembly.

Another object of the present invention is to provide such a structure wherein a single signal means is operated to indicate both when the electronic flash assembly is ready for operation and when a proper exposure cannot be made with the electronic flash assembly.

In particular, it is an object of the invention to provide a structure which will let the operator know when a proper exposure cannot be made without requiring the operator to initiate the operation of the shutter-release structure of the camera.

Thus, it is an object of the invention to provide a structure which can accomplish the above objects and which at the same time is exceedingly simple and compact.

In accordance with the invention, a single signal means which may take the form of a single lamp is connected to a suitable circuit means wih an electronic flash assembly to be operated in one way for indicating to the operator when the electronic flash assembly is ready for operation and to be operated in another way to indicate to the operator when a proper exposure cannot be made.

The invention is illustrated by way of example in the accompanying drawings which form part of the application and in which.

Figure 1:
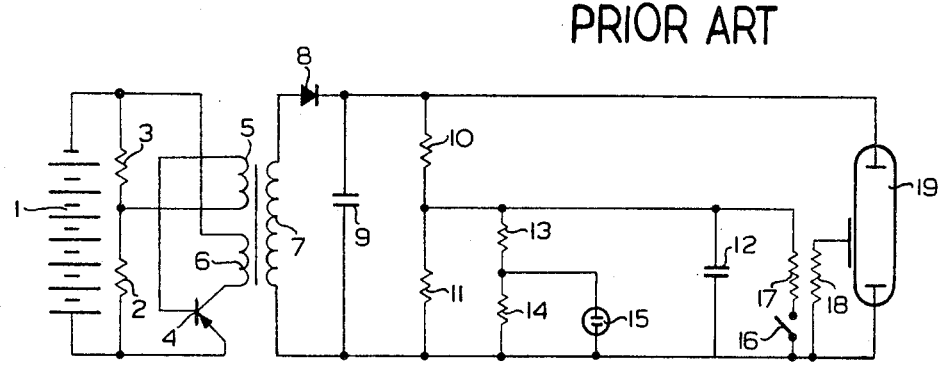
FIG. 1 is a wiring diagram of a known structure for operating an electronic flash assembly and a suitable means.

Referring to FIG. 1, there is indicated therein a generally known circuit which includes a battery 1 and a pair of resistors 2 and 3 as well as a transistor 4 and a transformer 5, 6, this structure providing an oscillating transistor circuit whose oscillations are transmitted through the coil 7 to the rectifier 8 and after rectification to the storage capacitor 9 for charging the latter. When this capacitor 9 has been charged to a predetermined degree, it charges, through the voltage divider 10, 11 the ignition capacitor 12, and through the voltage divider 13, 14, the lamp 15 will begin to glow at this time, this lamp being visible to the operator so as to provide a signal indicating to the operator that the built-in electronic flash assembly 19 is ready for operation. Thus, this known circuit will energize the signal means 15 so as to provide a steady illumination thereof for indicating to the operator when the electronic flash is ready for operation. During the making of an exposure the switch 16 will be automatically closed in proper synchronization with the operation of the shutter, so that the capacitor 12 will discharge through the transformer 17, 18, so as to ignite the electronic flash 19, and thus, the storage capacitor 9 discharges to convert its energy into the desired flash illumination.

Figure 2:
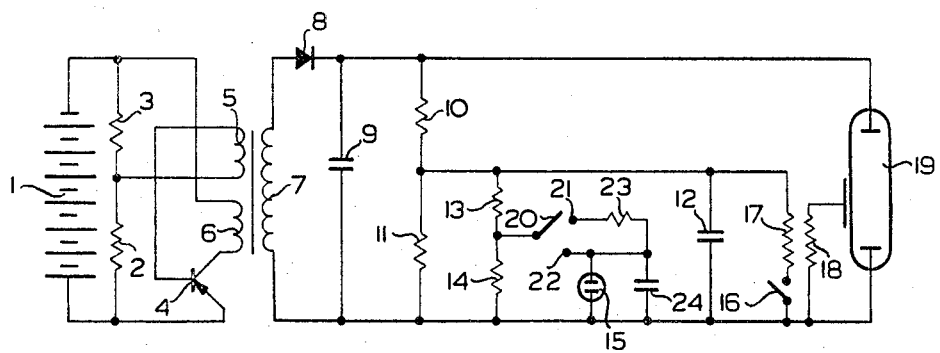
FIG. 2 shows how the structure of FIG. 1 is modified in accordance with the present invention.

Referring now to FIG. 2, it will be seen that the circuit of FIG. 1 is included in FIG. 2 and the same reference characters are used for the same parts all of which function in precisely the same way. However, it will be noted that the circuit of FIG. 2 has been modified as compared to the circuit of FIG. 1, in that the circuit of FIG. 2 includes a two-pole switch 20-22 having a movable switch arm 20 and a pair of contacts 21 and 22, the circuit further including the resistor 23 and the capacitor 24 which is connected in parallel with the lamp 15.

When the switch arm 20 engages the contact 22, and this is the normal position of the two-pole switch of the invention, then the lamp 15 will be connected into the cidcuit in the same way as in FIG. 1 and it will provide a steady illumination giving a signal that the condition of the charge of the capacitor 9 is sufficient for proper operation of the electronic flash 19.

However, if the switch arm 20 engages the other contact 21 of the two-pole switch, and this change in the position of the switch may be brought about by adjustment of the diaphragm in a manner described below, then it will be seen that the portion of the circuit which includes the resistor 23 and the capacitor 24 is now rendered operative, so that at this time the current from the voltage divider 13, 14 will flow through the resistor 23 and will charge the capacitor 24. When this capacitor 24 has been charged to a predetermined degree, it will discharge through the lamp 15, and in this way intermittent charging and discharging of the capacitor 24 and energizing and de-energizing of the lamp 15 will take place in a well known manner, at a predetermined frequency, providing intermittent illumination of the signal lamp 15, so that the operator will know that a proper exposure cannot be made as a result of the different type of operation of the same signal means 15.

Figure 3:
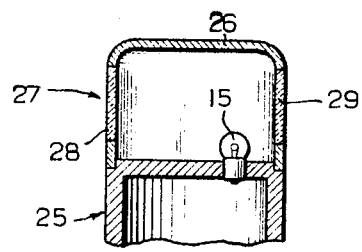
FIG. 3 is a schematic sectional illustration of how the signal means is rendered visible in the viewfinder of the camera.

According to a further feature of the invention the signal means 15 is positioned so as to be visible in the viewfinder. Thus, referring to FIG. 3, it will be seen that the camera 25 is provided with the compartment 26, as is well known, which houses the viewfinder 27 which may include the ocular 28 and the front viewfinder objective 29, as well as other conventional viewfinder structures. The lamp 15 is positioned so that while the operator views the object through the viewfinder the illumination or nonillumination of the lamp 15 will also be apparent to the operator. Thus, while looking at the object which is to be photographed, the operator will simultaneously perceive whether the lamp 15 is steadily illuminated, indicating that the electronic flash is ready for operation, or whether the lamp 15 is intermittently illuminated providing a blinking signal indicating unmistakably to the operator that a proper exposure cannot be made. It is to be noted that this arrangement is far better than one where, for example, the signal which indicates that a proper exposure cannot be made renders the shutter ineffective as by preventing the shutter from being operated when the operator attempts to release the shutter. With this latter type of construction the operator will proceed all the way to shutter release and will only know when he tries to release the shutter that a proper exposure cannot be made, whereas with the present invention the operator does not even attempt to release the shutter since he knows when looking at the subject which is to be photographed that a proper exposure can or cannot be made.

Figure 4:
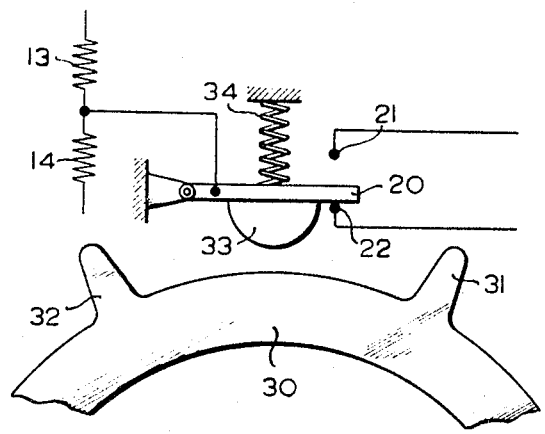
FIG. 4 schematically illustrates how the structure of the invention is automatically actuated in response to placing of the diaphragm in either one of its end positions.

When operating with flash illumination the distance-setting structure of the objective is automatically coupled in a well known manner with the diaphragm-setting structure of the objective so that the diaphragm is set simultaneously with a setting of the distance, and FIG. 4 diagrammatically shows a diaphragm-setting ring 30 which in accordance with the invention is provided with a pair of cams 31 and 32 which are directed straight up when the diaphragm reaches its end positions. FIG. 4 diagrammatically illustrates a camming portion 33 of the switch arm 20 as well as a spring 34 which urges the switch arm 20 into engagement with the contact 22 so as to provide normal operation in the same way as shown in FIG. 1. However, when the diaphragm has been adjusted so as to reach its end positions, then the cams 31, 32 will cooperate with the cam 33 for placing automatically the switch arm 20 into engagement with the contact 21, so as to provide the blinking signal referred to above. For example, when the diaphragm is set at its smallest possible aperture, the cam 32 by engaging the cam 33 will place the arm 20 into engagement with the contact 21, while when the diaphragm is set at its largest aperture the cam 31 will engage the cam 33 to place the arm 20 in engagement with the contact 21.

In this way the structure of the invention provides through the same signalling means 15 either a signal that the electronic flash is ready for operation, or a signal that a proper exposure cannot be made. Thus, the operator will know with the structure of the present invention, whether the electronic flash 19 is ready for operation as well as whether, within the range of the flash guide number of the particular electronic flash assembly it is possible under the particular photographic conditions to make a proper exposure, so that in this way the operator will not obtain either underexposures or overexposures but will simply know enough not to make an exposure if the result will be an overexposure or an underexposure.

What is claimed is:

1. In a camera, electronic flash means, a single electrical lamp, and circuit means connected with said electronic flash means and with said single lamp for operating the latter to provide a steady illumination for indicating that the electronic flash means is ready for operation and operating said single lamp to provide intermittent illumination for indicating that a proper exposure cannot be made.

2. In a camera as recited in claim 1, a viewfinder means in which a light from said lamp is visible.

3. In a camera, electronic flash means, a single electrical signal means, and circuit means connected with said electronic flash means and with said single electrical signal means for operating the latter in one way to provide a signal indicating that the electronic flash means is ready for operation and operating said single signal means in another way to provide another signal indicating that a proper exposure cannot be made, said signal means being a lamp, and said camera including a diaphragm means adjustable between predetermined end positions, said circuit means including a two-pole switch normally assuming one position, when said diaphragm means is between said end positions thereof, for connecting said lamp into said circuit means and to provide continuous illumination of said lamp when said electronic flash means is ready for operation, and said circiut means placing said two-pole switch automatically in the other of its positions when said diaphragm means reaches either of its end positions, said circuit means connecting a capacitor in parallel with said lamp when said switch is in said other position thereof for intermittently illuminating said lamp to indicate that the diaphragm means is at an end position which will not provide a proper exposure.

4. In a camera as recited in claim 3, said diaphragm means acting directly on said two-pole switch for moving the latter to said other position thereof when said diaphragm means reaches said end positions thereof.

5. In a camera as recited in claim 3, a viewfinder means in which a light from said lamp is visible.

References Cited by the Examiner

UNITED STATES PATENTS

| 2,295,217 | 9/1942 | Judge | 340—331 |
| 2,971,432 | 2/1961 | Blank | 352—171 |

FOREIGN PATENTS

| 1,305,133 | 8/1962 | France. |

JOHN M. HORAN, *Primary Examiner.*